A. Fuller,

Faucet.

No. 752.

Reissued July 5, 1859.

Witnesses:

Edw. F. Brown

Daniel Breed

Inventor:

Albert Fuller

UNITED STATES PATENT OFFICE.

ALBERT FULLER, OF CINCINNATI, OHIO.

IMPROVED FAUCET.

Specification forming part of Letters Patent No. 13,677, dated October 16, 1855; Reissue No. 752, dated July 5, 1859.

*To all whom it may concern:*

Be it known that I, ALBERT FULLER, of Cincinnati, in the county of Hamilton and State of Ohio, have invented new and useful Improvements in Stop-Cocks; and I do hereby declare that the following is a full and complete description thereof, reference being had to the accompanying drawings, and to the letters of reference marked thereon.

In the construction of stop-cocks it is difficult to make metallic joints permanently tight; therefore a packing of india-rubber or other elastic material has been much employed. But such packing is liable soon to become ineffectual, either from its wear, owing to the rubbing or abrasion of its surface in opening and closing the valve or from the compression and hardening of the packing. Consequently the packing must often be renewed, which is not only expensive, but a serious inconvenience, as the stop cock is out of repair at a time when it is wanted for use.

My invention consists in an improvement in the construction and operation of stop-cocks or faucets, by which all difficulty from the abrasion or wear of the rubber surface and the hardening of the rubber from compression is avoided, thus rendering the cocks far more durable and reliable.

Figure 2:
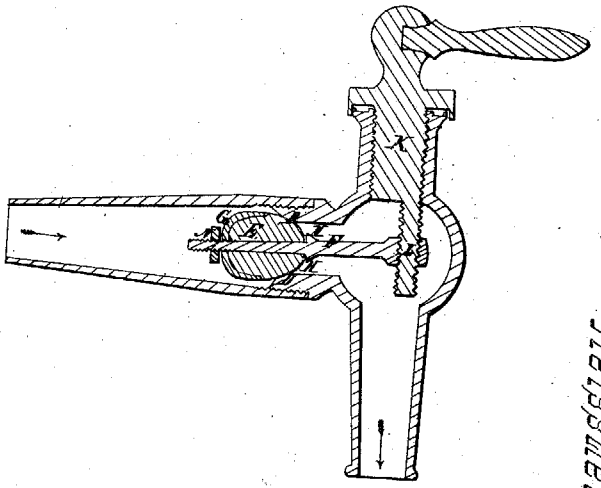
Figure 3:
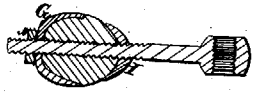
Figure 1:
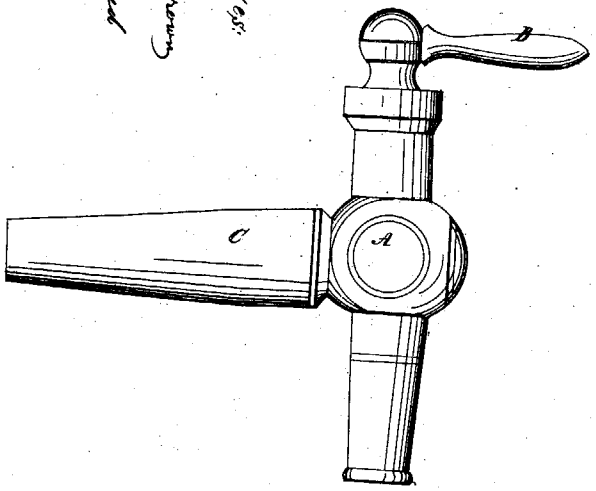

In the accompanying drawings, Figure 1 is a side view of a faucet or stop cock with my improvement, and having a portion of the supply pipe attached. Fig. 2 is a perpendicular section of the same, showing my improvements. Fig. 3 is a modified arrangement of the valve.

In Fig. 1, A represents the faucet, B the handle for opening and closing the valve, and C a portion of the supply-pipe. The water or steam flows in the direction of the arrows, Fig. 2. The supply-pipe C is connected with the cock A by screw-threads, and the valve-seat D is situated at this point of connection, so that the valve is outside the chamber of the cock. By this arrangement the valve is conveniently inserted, and as the water is excluded from the chamber of the cock when the valve is closed, there is no possibility of injury to the faucet by the freezing of the water.

The valve consists, essentially, of a plug of india-rubber, which must be of sufficient length and thickness for the elasticity of the rubber ball permanently to resist the whole force of the fluid without crushing the rubber or hardening it by compression. The plug must also be large enough plumply to fill the valve-seat without sliding into the latter so as to abrade the surface of the rubber. This plug is shown at E, Fig. 2. It is molded from semi-fluid rubber under a very great pressure, and then vulcanized in the mold at a temperature of about 600° Fahrenheit. It is attached to a stem, F, so as to receive a positive motion from the eccentric arm L.

In order permanently to preserve the original shape of the plug, a dish-shaped shield, G, is employed, and also a broad shoulder, H, upon the stem F, Fig. 2, or a screw-cap, I, Fig. 3. The shield G so embraces the rubber plug as to prevent the pressure of the valve-seat from either crushing or spreading the plug, thus enabling the rubber permanently to resist such pressure without being forced out of shape or hardened by compression. By means of a screw-nut, N, the shield G can be pressed forward so as to compress the plug E between said shield and the shoulders H, shortening the plug longitudinally and expanding it laterally. In this manner the plug, when slightly worn by long use, may be enlarged, better to fill the valve-seat. This adjustment of the shield G not only changes the shape of the ball or plug of rubber, but also in effect adjusts the plug upon the stem F so that the rubber presents a new bearing to meet the valve seat D. For the same purpose the plug or ball of rubber may be made completely adjustable along the stem F without changing the shape of the plug, as shown in Fig. 3, where an adjustable cap, I, is used instead of the shoulder H, Fig. 2. Therefore the length of the stem F or the distance between the rubber plug and the eccentric arm L can be changed so as always to bring the valve firmly home upon its seat when the eccentric completes its stroke without overcompressing the rubber valve or plug.

The number of screw-threads to the inch cut upon the arm L is the same as that cut upon the shaft K, so that the arm is conveniently inserted, and will always bring the stem F into proper position in the center of the valve-seat. Thus the valve is supported so as to move back and forth without dragging, and is drawn into the valve-seat with great accuracy. Consequently the plug is never worn away on one side so as to become irregular in shape, and thus fail to make a close joint. The valve, being outside of the chamber of the cock and working in the supply-tube, is drawn into its seat in the same direction that the water flows. Therefore the pressure of the water can never force the valve from its seat, but always tends to hold the valve securely in place and prevent leakage. This construction of stop-cock is applicable to steam as well as to water, as the increased pressure of steam upon the valve serves to tighten the joint by pressing the valve more closely upon its seat. In like manner the freezing of water in the supply-pipe C presses the valve more firmly into its seat without injury to the cock. This yielding of the valve gives room for the ice, and thus prevents the rupture of the supply-pipe near the stop-cock.

My improved stop-cock combines the following advantages:

First. The whole body of the plug or valve, being made of india-rubber, is so compressible both longitudinally and laterally that it may be brought home upon its seat by a positive motion with sufficient force to make a reliable joint without either the abrasion or the hardening of the india-rubber, and, the plug being confined by a cap, the india-rubber is not easily pressed out of shape. Therefore, it is far more durable than a valve having a mere packing of india-rubber.

Second. The valve is drawn into its seat in the direction in which the water or steam flows, so that the pressure of the fluid tends to hold the valve in place, instead of forcing it from its seat.

Third. The motion of the eccentric is limited, so as never to overcompress the elastic plug-valve.

Fourth. The plug valve may be compressed longitudinally, and thus expanded laterally, in order to enable it better to fit the valve seat after it has been a long time in use.

Fifth. The plug or valve is adjustable upon the stem, so as to regulate the action of the eccentric arm or the force with which the valve is pressed into its seat.

Sixth. The valve being placed outside the chamber of the cock, the fluid all escapes from the faucet as soon as the valve is closed. Therefore, it is impossible to injure the faucet by freezing.

I am aware that in the construction of faucets and stop-cocks a packing or lining of india-rubber has been used to form a tight joint. Therefore, I do not broadly claim the use of india-rubber, but confine my claims in regard to india-rubber to my improved mode of using the latter. Neither do I claim the above-described mechanical devices as new in themselves; but I limit my claims to the improvements in faucets or stop cocks.

I do not confine myself to the precise construction above described so long as the same result is produced, as the arrangement of parts may be somewhat varied, or gutta-percha may be substituted for india-rubber without departing from the principles of my invention or improvements.

Having thus fully described my invention, what I claim as an improvement in stop-cocks, and desire to secure by Letters Patent of the United States, is—

1. The elastic plug-valve attached to a stem, when operated by an eccentric or its equivalent, substantially as set forth, for the purposes described.

2. The elastic plug-valve, constructed as described, in combination with the cup-shaped cap to prevent the plug from spreading, substantially as described.

ALBERT FULLER.

Witnesses:

EDM. F. BROWN,
DANIEL BREED.